(12) United States Patent
Jean et al.

(10) Patent No.: US 10,191,315 B2
(45) Date of Patent: *Jan. 29, 2019

(54) DISPLAY APPARATUS

(71) Applicant: LG Display Co., Ltd., Seoul (KR)

(72) Inventors: Ki Nam Jean, Gumi-si (KR); Nam Do Son, Gyeongsangbuk-do (KR); Kyeong Tak Baek, Daegu (KR); Dong Yong Kim, Samcheok-si (KR); Min Jae Kim, Jeonju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 59 days.

This patent is subject to a terminal disclaimer.

(21) Appl. No.: 15/204,378

(22) Filed: Jul. 7, 2016

(65) Prior Publication Data
US 2016/0320660 A1 Nov. 3, 2016

Related U.S. Application Data

(63) Continuation of application No. 12/982,530, filed on Dec. 30, 2010.

(30) Foreign Application Priority Data
Apr. 27, 2010 (KR) .......................... 10-2010-0039174

(51) Int. Cl.
*G02F 1/1333* (2006.01)
*H04N 5/64* (2006.01)

(52) U.S. Cl.
CPC .......... *G02F 1/133308* (2013.01); *H04N 5/64* (2013.01); *G02F 2201/46* (2013.01); *G02F 2202/28* (2013.01)

(58) Field of Classification Search
CPC .......... G02F 1/133308; G02F 2202/28; G02F 2201/46; H04N 5/64
See application file for complete search history.

(56) References Cited

U.S. PATENT DOCUMENTS 6,424,391 B1 * 7/2002 Tsukamoto ....... G02F 1/133308
349/58
6,654,078 B1 * 11/2003 Kato ................. G02F 1/133308
349/58
(Continued)

FOREIGN PATENT DOCUMENTS

CN 1512237 7/2004
CN 1530711 9/2004
(Continued)

*Primary Examiner* — Jose Soto Lopez
(74) *Attorney, Agent, or Firm* — Dentons US LLP

(57) ABSTRACT

Disclosed is a display apparatus which facilitates minimized thickness by innovatively removing a case and some portions of a set cover, which have been regarded as indispensable structures for the display apparatus, and simultaneously facilitates good aesthetic exterior appearance of the display apparatus by a novel design. The display apparatus comprises a set cover exposed externally and formed to have a storage space; a guide frame received in the storage space; a screw coupled to the guide frame by penetrating through the set cover so as to fix the guide frame to the set cover; a display unit placed onto the guide frame; and an adhesive member for fixedly adhering the display unit to the guide frame.

19 Claims, 10 Drawing Sheets

(56) References Cited

U.S. PATENT DOCUMENTS

| | | | | |
|---|---|---|---|---|
| 7,929,072 B2* | 4/2011 | Oohira | .............. | G02F 1/133308 252/299.3 |
| 2002/0186526 A1* | 12/2002 | Kim | .................. | G02F 1/133308 361/679.05 |
| 2003/0103170 A1* | 6/2003 | Nagata | .............. | G02F 1/133308 348/794 |
| 2004/0041504 A1* | 3/2004 | Ozolins | ................. | G02F 1/1333 313/110 |
| 2004/0062057 A1* | 4/2004 | Ha | ....................... | G02B 6/0031 362/561 |
| 2004/0125267 A1* | 7/2004 | Noh | ....................... | G02F 1/133 349/58 |
| 2004/0246397 A1* | 12/2004 | Kang | ................ | G02F 1/133308 349/58 |
| 2006/0087804 A1* | 4/2006 | Tsukamoto | ....... | G02F 1/133308 361/679.22 |
| 2006/0209226 A1* | 9/2006 | Chung | ............. | G02F 1/133308 349/58 |
| 2006/0285030 A1* | 12/2006 | Kim | .................. | G02F 1/133308 349/58 |
| 2007/0085943 A1* | 4/2007 | Kang | ................... | G02B 6/0031 349/65 |
| 2008/0020150 A1* | 1/2008 | Kim | .................. | G02F 1/133308 428/1.31 |
| 2008/0151138 A1* | 6/2008 | Tanaka | ............. | G02F 1/133308 349/58 |
| 2008/0252808 A1* | 10/2008 | Chang | ............... | G02F 1/133608 349/58 |
| 2008/0278895 A1* | 11/2008 | Woo | .................. | G02F 1/133308 361/679.02 |
| 2008/0297680 A1* | 12/2008 | Hwang | ............ | G02F 1/133308 349/58 |
| 2009/0122476 A1* | 5/2009 | Won | .................. | G02F 1/133308 361/679.21 |
| 2011/0134355 A1* | 6/2011 | Yi | ..................... | G02F 1/133512 349/58 |

FOREIGN PATENT DOCUMENTS

| | | |
|---|---|---|
| CN | 1806267 | 7/2006 |
| CN | 1885100 | 12/2006 |
| CN | 101206317 A | 6/2008 |
| CN | 101221310 A | 7/2008 |
| CN | 101430845 A | 5/2009 |
| JP | 2008-158432 | 7/2008 |
| KR | 20090047569 | 5/2009 |
| TW | 200530657 A | 9/2005 |
| TW | 200426467 | 2/2012 |

* cited by examiner

DISPLAY APPARATUS

CROSS REFERENCE TO RELATED APPLICATIONS

This application is a Continuation of U.S. application Ser. No. 12/982,530 filed on Dec. 30, 2010, now allowed, which claims the benefit of the Korean Patent Application No. 10-2010-0039174 filed on Apr. 27, 2010, which is hereby incorporated by reference as if fully set forth herein.

BACKGROUND

Field of the Invention

The present invention relates to a display apparatus, and more particularly, to a display apparatus which facilitates minimized thickness by innovatively removing a case and some portions of a set cover, which have been regarded as indispensable structures for the display apparatus, and simultaneously facilitates to realize good aesthetic exterior appearance of the display apparatus by a novel design.

Discussion of the Related Art

Recently, various flat-type display devices have been actively developed and researched to decrease heavy weight and large volume which correspond to disadvantages of Cathode Ray Tubes (CRT), for example, Liquid Crystal Display (LCD) devices, Plasma Display Panels (PDP), Field Emission Display (FED) devices, Light Emitting Display (LED) devices, etc. Especially, among these devices, the LCD device has attracted great attention owing to its advantages such as ability to be mass produced, simple driving means, and high picture quality.

In addition to the technical aspects of the flat-type display apparatus, there is an increasing demand for research and development of flat-type display apparatus design. This research includes steady efforts toward minimization in thickness of the display apparatus (for example, slimness) while simultaneously increasing satisfactory designs which are capable of arousing customer's interest.

However, the existing design for slimness and good aesthetic exterior appearance of the display apparatus has been developed by changing a structure of components included in the display apparatus under the circumstances that all components are used for the display apparatus. Thus, it makes a limitation in the slimness of the display apparatus and the development of the new design.

For instance, a related art LCD device necessarily uses lower and upper cases to receive a liquid crystal display unit and a backlight unit therein. In addition, front and rear set covers are additionally used in the related art LCD device to manufacture notebook computers, monitors, mobile devices, or televisions. As the lower and upper cases and the front and rear set covers for the manufactured device are inevitably used in the display device, these limit the slimness of the display device and the development of the new design. Especially, the upper edges of the liquid crystal display panel are covered with the upper case and front set cover, whereby the liquid crystal display device is increased in its thickness. Also, the edge width of the liquid crystal display device is increased so that step coverage of the edge is increased, which might be an obstruction to the development of innovative design.

SUMMARY

Accordingly, the present invention is directed to a display apparatus that substantially obviates one or more problems due to limitations and disadvantages of the related art.

An advantage of the present invention is to provide a display apparatus which minimize thickness by innovatively removing a case and some portions of a set cover, which have been regarded as indispensable structures for the display apparatus, and simultaneously facilitates to realize a good aesthetic exterior appearance of the display apparatus by a novel design.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display apparatus comprising: a set cover exposed to the external and formed to have a storage space; a guide frame received in the storage space; a screw coupled to the guide frame by penetrating through the set cover so as to fix the guide frame to the set cover; a display unit placed onto the guide frame; and an adhesive member for fixedly adhering the display unit to the guide frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display apparatus according to the present invention will be described with reference to the accompanying drawings.

Figure 1:
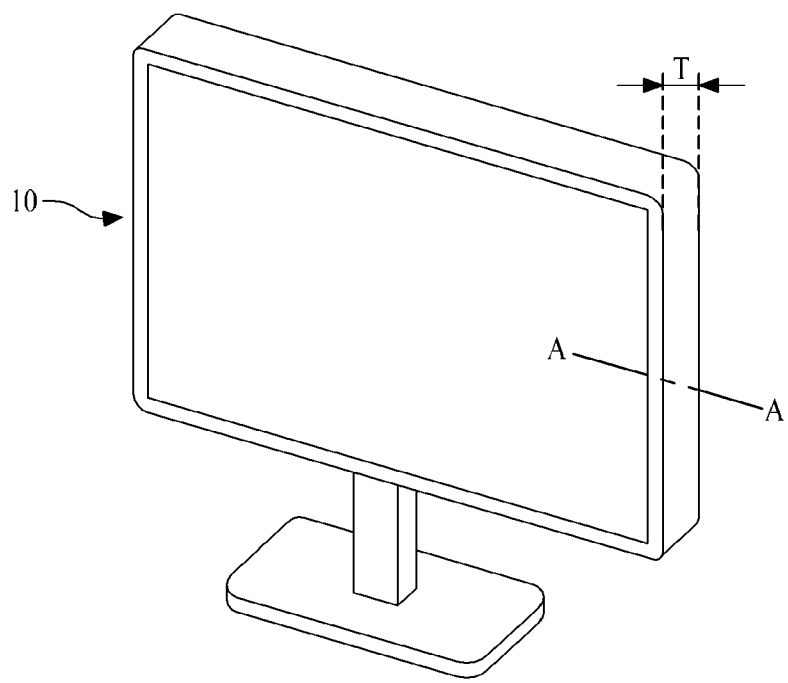
FIG. 1 illustrates a display apparatus used for a monitor or television according to an exemplary embodiment of the present invention.
Figure 2:
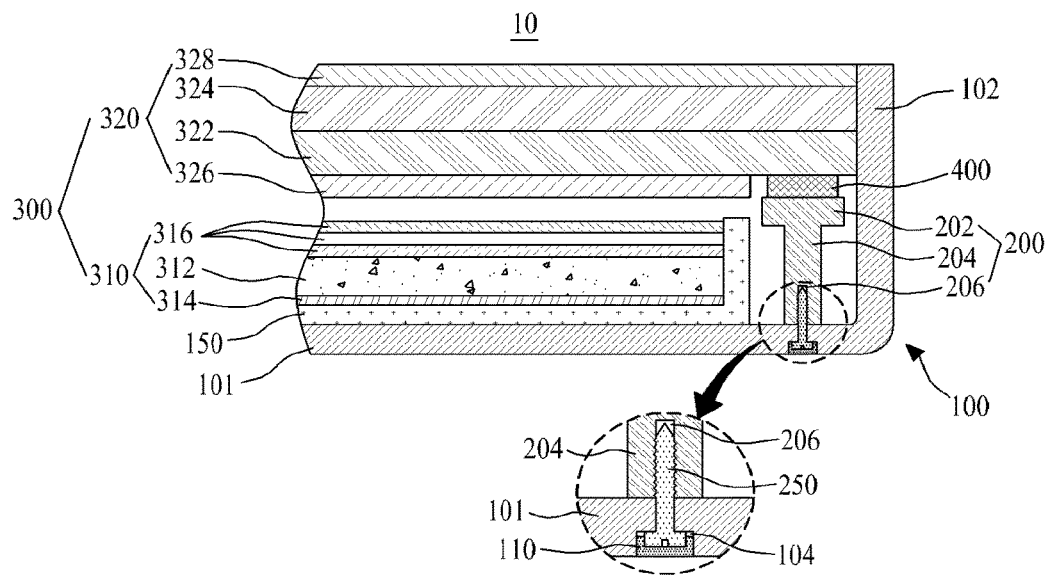
FIG. 2 is a cross section view along A-A of FIG. 1, which illustrates a display apparatus according to a first exemplary embodiment of the present invention.

FIG. 1 illustrates a display apparatus used for a monitor or television according to an exemplary embodiment of the present invention. FIG. 2 is a cross section view along A-A of FIG. 1, which illustrates a display apparatus according to a first exemplary embodiment of the present invention.

Referring to FIG. 2, the display apparatus 10 according to a first embodiment of the present invention may include a set cover 100, a guide frame 200, a screw 250, a display unit 300, and an adhesive member 400.

The set cover 100 may be formed in a rectangular-shaped frame. The set cover 100 may support the guide frame 200 and display unit 300, and simultaneously cover a lateral side of the guide frame 200, whereby the set cover 100 functions as a cover of the manufactured display apparatus. In this case, the set cover 100 may be formed of a plastic material or metal material. For a good aesthetic exterior appearance of the manufactured display apparatus, the set cover 100 may be formed of metal material, preferably. For this, the set cover 100 may include a set plate 101, a set sidewall 102, and a screw insertion hole 104.

The set plate 101 may be formed flat, which may function as a rear cover of the manufactured display apparatus.

The set sidewall 102 may vertically curve from the set plate 101, to thereby form a storage space. Here, an upper end of the set sidewall 102 may cover a lateral side of the display unit 300. Simultaneously, the upper end of the set sidewall 102 may be exposed externally while not overlapping with an upper edge of the display unit 300, whereby the upper end of the set sidewall 102 may form an edge of the display unit 300.

The screw insertion hole 104 may be formed in a rear surface of the set plate 101 so that the screw 250 may penetrate through the screw insertion hole 104, and also a head of the screw 250 may be inserted into the screw insertion hole 104.

Figure 3:
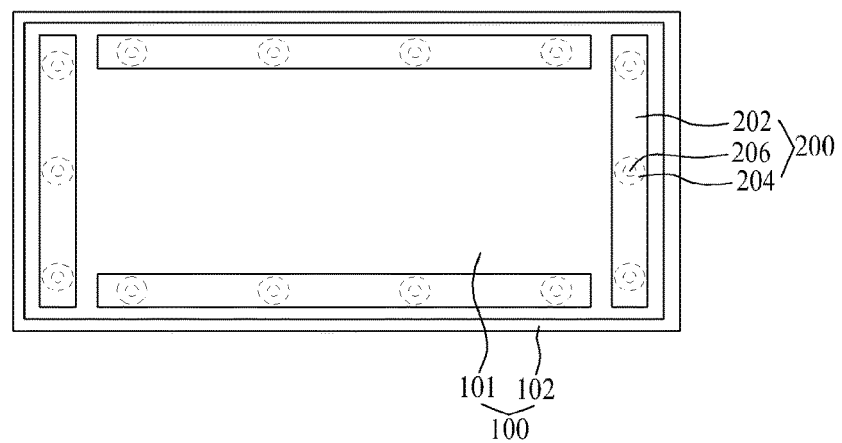
FIG. 3 illustrates an arrangement structure of a guide frame connected to a set cover shown in FIG. 2.
Figure 4:
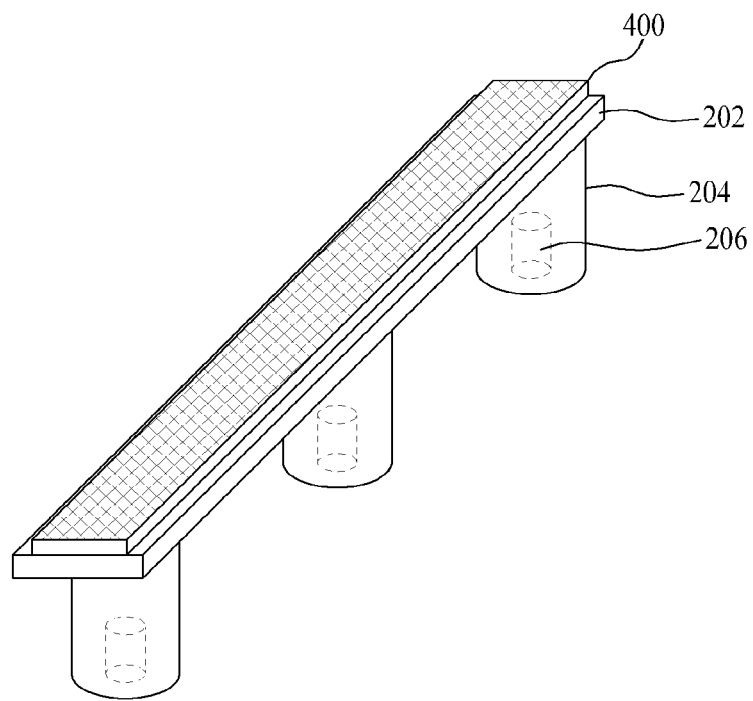
FIG. 4 is a perspective view illustrating a guide frame shown in FIG. 2 or 3.

The guide frame 200, which may be received in the storage space of the set cover 100, may support the display unit 300. For this, as shown in FIGS. 3 and 4, the guide frame 200 may include a first part 202, a plurality of bosses 204, and a screw coupling hole 206.

The first part 202 may be formed flat onto which the display unit 300 is placed and fixed by the adhesive member 400. In this case, the first part 202 may be divided into plural sub first parts provided along each edge of the set plate 101.

Meanwhile, the first part 202 may be formed in a rectangular-shaped frame along the respective edges of the display unit 300.

The plurality of bosses 204 may vertically protrude from a rear surface of the first part 202 toward the set plate 101, wherein each of the protruding bosses 204, which has a predetermined height, may meet with the screw insertion hole 104 in the set plate 101. At this time, the plurality of bosses 204 protruding from the rear surface of the first part 202 divided into the plural sub first parts may be provided at fixed intervals.

Each of the plural screw coupling holes 206 may be formed at a lower portion of each of the plural bosses 204.

A color of the aforementioned guide frame 200 may be the same as a color displayed for a non-driving mode of the display unit 300. For example, it is preferable that the guide frame 200 have a black color.

In FIG. 2, the screw 250 may be inserted into the screw insertion hole 104 by penetrating through the set plate 101 so that the screw 250 may be coupled to the screw coupling hole 206 in the boss 204. Accordingly, the guide frame 200 may be fixed into the set plate 101. In this case, the head of the screw 250 may be received in the screw insertion hole 104 without being protruded to the external.

The set plate 101 may function as the rear cover of the manufactured display apparatus. Thus, if the plural screw insertion holes 104 exist in the rear surface of the set plate 101, it may cause a deteriorated aesthetic appearance of the display apparatus. Accordingly, the display apparatus 10 according to the first embodiment of the present invention may further comprise a sealing cap 110 to seal the screw insertion hole 104 in which the head of the screw 250 is received. Preferably, a color of the sealing cap 110 is the same as a color of the set plate 101. Also, the sealing cap 110 may be formed of a flexible material which allows separation of the head of the screw 250 from the screw insertion hole 104 and to expose the separated head of the screw 250 externally with ease when a worker tries to separate the set plate 101 and guide frame 200 from each other, preferably.

The display unit 300 may include a backlight unit 310 and a liquid crystal display panel 320.

The backlight unit 310, which may be received in the storage space, emits light to the rear surface of the liquid crystal display panel 320. For this, the backlight unit 310 may comprise a light-guiding plate 312, a reflective sheet 314, and an optical member 316.

The light-guiding plate 312 may be formed flat to have a light-incidence surface, whereby the light-guiding plate 312 guides the light, which is emitted from a light source (not shown) and is then incident on the light-incidence surface, toward the liquid crystal display panel 320. At this time, the light source (not shown) may be formed to include a fluorescent lamp or light-emitting diode.

The reflective sheet 314 may be arranged on a rear surface of the light-guiding plate 312, to thereby reflect the light from the light-guiding plate 312 toward the liquid crystal display panel 320.

The optical member 316, which may be arranged on the light-guiding plate 312, improves a luminance property of the light advancing toward the liquid crystal display panel 320 from the light-guiding plate 312. For this, the optical member 316 may comprise at least two sheets of a lower diffusion sheet, a lower prism sheet, an upper prism sheet, and an upper diffusion sheet.

The lower diffusion sheet, which may be arranged on the light-guiding plate 312, diffuses the light incident from the light-guiding plate 312, and applies the diffused light to the lower prism sheet.

The lower prism sheet, which may be arranged on the lower diffusion sheet, concentrates the light incident from the lower diffusion sheet into a first direction, and applies the concentrated light to the upper prism sheet. At this time, the first direction may correspond to a long or short side direction of the light-guiding plate 312.

The upper prism sheet, which may be arranged on the lower prism sheet, concentrates the light incident from the lower prism sheet into a second direction, and applies the concentrated light to the upper diffusion sheet. At this time, the second direction may be perpendicular to the first direction. According to the structure of the backlight unit 310, the upper prism sheet may be omitted. Also, the lower and upper prism sheets may be substituted by one prism sheet including first and second light-concentrating patterns to concentrate the light from the lower diffusion sheet into the first and second directions. Furthermore, the first and second light-concentrating patterns may be formed on the lower diffusion sheet. If the first and second light-concentrating patterns are formed on the lower diffusion sheet, it is possible to omit the lower and upper prism sheets.

The upper diffusion sheet, which may be arranged on the upper prism sheet, diffuses the light incident from the upper prism sheet, and applies the diffused light to the liquid crystal display panel 320. At this time, if the upper prism sheet is omitted, the upper diffusion sheet may be arranged on the lower prism sheet to diffuse the light incident from the lower prism sheet and to apply the diffused light to the liquid crystal display panel 320. Also, if both the lower and upper prism sheets are omitted, the upper diffusion sheet may diffuse the light incident from the lower diffusion sheet with the first and second light-concentrating patterns, and apply the diffused light to the liquid crystal display panel 320.

There may be a support cover 150 which is placed onto the set plate 101, wherein the support cover 150 supports the aforementioned backlight unit 310.

The support cover 150 may comprise a support plate which is placed onto the set plate 101; and a support sidewall which is curved from the support plate. The backlight unit 310 may be received in and supported by a supporting place prepared by the support plate and support sidewall. At this time, the support cover 150 may be formed of the metal material so as to smoothly dissipate heat generated externally from the display unit 300. The support cover 150 may be connected to the set plate 101 through the use of adhesive member (for example, double-sided tape) or coupling screw.

The liquid crystal display panel 320 may be placed onto the guide frame 200 so that the liquid crystal display panel 320 is arranged on the backlight unit 310. The liquid crystal display panel 320 adjusts transmittance of light emitted from the backlight unit 310, to thereby display predetermined images. At this time, a rear edge portion of the liquid crystal display panel 320 may be placed onto the first part 202 of the guide frame 200, and a lateral side of the liquid crystal display panel 320 may be covered by the set sidewall 102 of the set cover 100. At this time, an upper surface of the set sidewall 102 may form a front edge of the liquid crystal display panel 320.

The liquid crystal display panel 320 may comprise a lower substrate 322, an upper substrate 324, a lower polarizing plate 326, and an upper polarizing plate 328.

The lower substrate 322 may include a plurality of pixels (not shown) in every regions formed by crossing a plurality of gate lines (not shown) and data lines (not shown). Each pixel may comprise a thin film transistor (not shown) connected to the gate and data lines; a pixel electrode connected to the thin film transistor; and a common electrode adjacent to the pixel electrode, wherein a common voltage is applied to the common electrode. The common electrode may be formed on the upper substrate 324 according to a driving mode of liquid crystal layer. The lower substrate 322 may form an electric field corresponding to a differential voltage between the common voltage and data voltage applied to each pixel, to thereby adjust the light transmittance of liquid crystal layer.

The upper substrate 324 may be formed to have a color filter corresponding to each pixel of the lower substrate 322. The lower and upper substrates 322 and 324 are bonded to each other with the liquid crystal layer interposed therebetween. At this time, the common electrode supplied with the common voltage may be formed on the upper substrate 324 according to the driving mode of the liquid crystal layer. The incident light passing through the liquid crystal layer may be filtered through the color filter of the upper substrate 324 so that the predetermined colored light is emitted externally. Accordingly, the predetermined colored image may be displayed on the liquid crystal display panel 320.

Meanwhile, a detailed structure of the lower and upper substrates 322 and 324 may vary according to the electro-optic mode of the liquid crystal display panel 320, for example, Twisted Nematic (TN) mode, Vertical Alignment (VA) mode, In-Plane Switching (IPS) mode, Fringe Field Switching (FFS) mode, and etc., which are generally known to those skilled in the art.

The lower polarizing plate 326 may be formed on the rear surface of the lower substrate 322, wherein the lower polarizing plate 326 polarizes the light incident from the backlight unit 310, and applies the polarized light to the lower substrate 322.

The upper polarizing plate 328 may be formed on the front surface of the upper substrate 324, whereby the light incident through the upper substrate 324 is polarized by the upper polarizing plate 328, and the polarized light is emitted to the external.

The aforementioned display unit 300 may be formed of a light-emitting display unit including a light-emitting display panel with an organic light-emitting device, instead of the liquid crystal display unit including the backlight unit 310 and the liquid crystal display panel 320. In this case, the support cover 150 for supporting the backlight unit 310 may be omitted.

The adhesive member 400 may be formed in the liquid crystal display panel 320, that is, along the edge of the rear surface of the lower substrate 322, or may be formed in the first part 202 of the guide frame 200 as shown in FIG. 4, to thereby connect the guide frame 200 and the liquid crystal display panel 320 to each other. For this, the adhesive member 400 may be the double-sided tape. Meanwhile, the adhesive member 400 may connect the lower polarizing plate 322 of the liquid crystal display panel 320 and the first part 202 to each other.

In the display apparatus 10 according to the first embodiment of the present invention, the guide frame 200 may be connected to the set plate 101 of the set cover 100 through the use of screw 250, and the display unit 300 is placed onto the guide frame 200 through the use of adhesive member 400, so that it is possible to decrease a total thickness (T) of the display apparatus by omitting lower and upper cases, and a front cover of the product, which have been essentially used for the related art display apparatus. If rework of the display apparatus 10 is needed, the liquid crystal display unit 300 may be easily separated from the set cover 100 by the separation of the screw 250.

In the display apparatus 10 according to the first embodiment of the present invention, the upper surface of the set sidewall 102 may form the edge of the display unit 300. Thus, there is no requirement for an additional structure for covering the upper edge of the display unit 300 and the lateral side of the guide frame 200, to thereby decrease the total thickness (T) of the display apparatus.

The display apparatus 10 according to the first embodiment of the present invention may minimize the edge of the display unit 300 by exposing only the liquid crystal display panel 320 and set sidewall 102 to a user. Thus, good aesthetic exterior appearance of the display apparatus may be realized owing to the minimized edge of the display unit 300.

Figure 5:
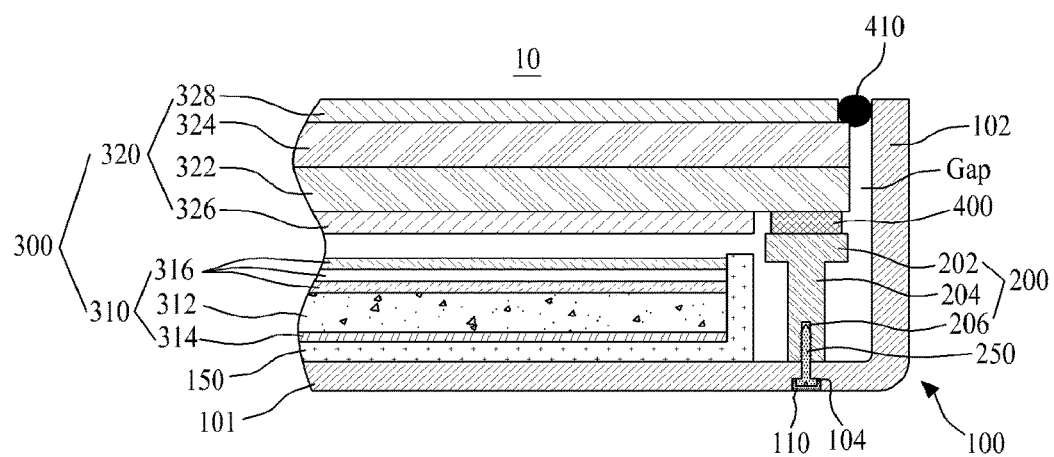
FIG. 5 illustrates a display apparatus according to a second exemplary embodiment of the present invention.

FIG. 5 illustrates a display apparatus according to a second exemplary embodiment of the present invention.

Referring to FIG. 5, the display apparatus 10 according to the second embodiment of the present invention may comprise a set cover 100, a guide frame 200, a screw 250, a display unit 300, an adhesive member 400, and a sealing member 410. Except that the sealing member 410 is additionally provided, the display apparatus 10 according to the second embodiment of the present invention may be identical in structure to the display apparatus according to the first embodiment of the present invention shown in FIGS. 2 to 4, whereby a detailed explanation for the same parts will be omitted.

First, when manufacturing the display unit 300, that is, liquid crystal display panel 320 and set sidewall 102, a gap may occur between a lateral side of the liquid crystal display panel 320 and the set sidewall 102 due to a manufacturing error. Accordingly, the sealing member 410 may seal the gap between the lateral side of the liquid crystal display panel 320 and the set sidewall 102, to thereby prevent foreign matters such as dust from coming into the inside of the display apparatus through the gap. At this time, a color of the sealing member 410 may be the same as a color of the set sidewall 102, which allows good aesthetic exterior appearance of the display apparatus by preventing a color difference between the sealing member 410 and the set sidewall 102.

For this, the sealing member 410 according to the first embodiment may be formed in a ring shape. The ring-shaped sealing member 410 may be inserted into the gap between the lateral side of the liquid crystal display panel 320 and the set sidewall 102, to thereby seal the gap.

Figure 6:
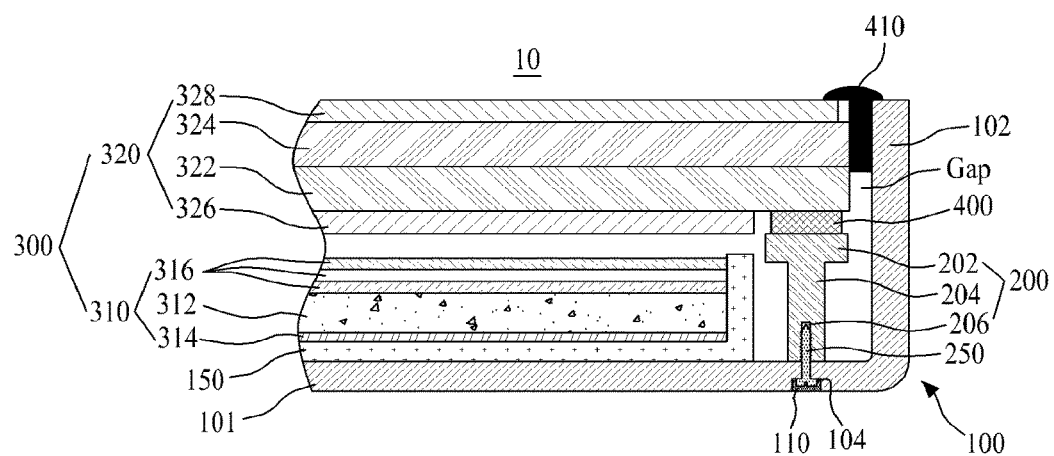
FIG. 6 illustrates the second embodiment of sealing member shown in FIG. 5.

As shown in FIG. 6, the sealing member 410 according to the second embodiment may be formed in a pin shape including a semicircular head, and a head supporter for supporting the semicircular head. At this time, the head supporter may be inserted into the gap, and the head is overlapped with the edge of the liquid crystal display panel 320 and the upper surface of the set sidewall 102 so as to cover the gap. Accordingly, the sealing member 410 may seal the gap between the lateral side of the liquid crystal display panel 320 and the set sidewall 102 through the use of head.

The display apparatus 10 according to the second embodiment of the present invention may seal the gap between the lateral side of the liquid crystal display panel 320 and the set sidewall 102 through the use of ring-shaped or pin-shaped sealing member 410, so that it is possible to prevent foreign matters such as dust from coming into the inside of the display apparatus through the gap. This allows the same effects as those of the aforementioned display apparatus according to the first embodiment of the present invention.

Figure 7:
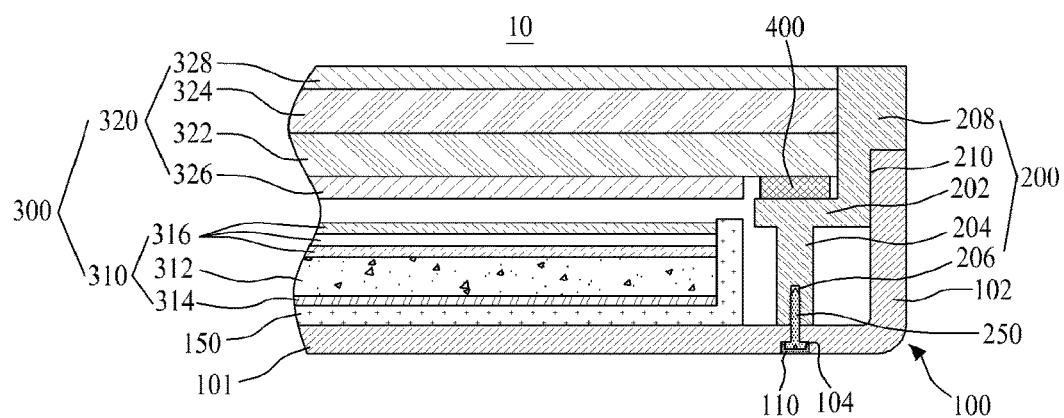
FIG. 7 illustrates a display apparatus according to a third exemplary embodiment of the present invention.

FIG. 7 illustrates a display apparatus according to a third exemplary embodiment of the present invention.

Referring to FIG. 7, the display apparatus 10 according to the third embodiment of the present invention may include a set cover 100, a guide frame 200, a screw 250, a display unit 300, and an adhesive member 400. Except the set cover 100 and guide frame 200, the display apparatus 10 according to the third embodiment of the present invention may be identical in structure to the display apparatus according to the first embodiment of the present invention shown in FIGS. 2 to 4, whereby a detailed explanation for the same parts will be omitted.

The set cover 100 may be formed in a rectangular-shaped frame for supporting the guide frame 200 and display unit 300, and covering a lateral side of the guide frame 200, whereby the set cover 100 functions as a cover of the manufactured display apparatus. The set cover 100 may comprise a set plate 101, a set sidewall 102, and a screw insertion hole 104. Except the set sidewall 102, the set cover 100 according to the third embodiment of the present invention may be identical in structure to the aforementioned set cover according to the first embodiment of the present invention, whereby a detailed explanation for the same parts will be omitted.

The set sidewall 102 may be vertically curved from the set plate 101 to provide a storage space, and simultaneously to cover a sidewall of the guide frame 200.

Figure 8:
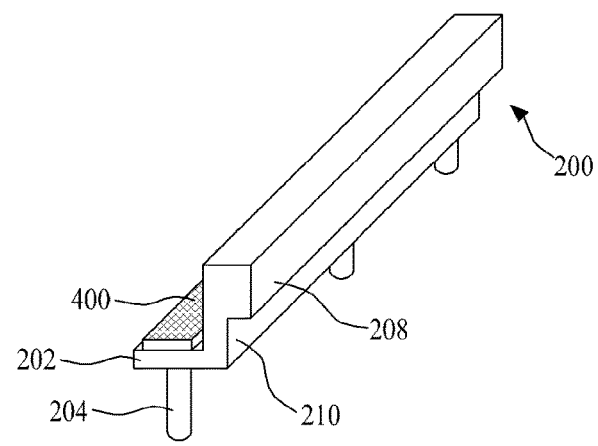
FIG. 8 is a perspective view illustrating a guide frame shown in FIG. 7.

The guide frame 200, which may be placed in the storage space of the set cover 100, supports the display unit 300. At this time, a color of the guide frame 200 may be the same as a color displayed for a non-driving mode of the display unit 300. For example, it is preferable that the guide frame 200 have a black color. For this, as shown in FIG. 8, the guide frame 200 may comprise a first part 202, a plurality of bosses 204, a screw coupling hole 206, a guide sidewall 208, and a set sidewall insertion groove 210. Except that the guide frame 200 has the guide sidewall 208 and set sidewall insertion groove 210, the guide frame 200 having the aforementioned structure may be identical in structure to the guide frame according to the first embodiment of the present invention, whereby a detailed explanation for the same parts will be omitted.

The guide sidewall 208 may be curved from the first part 202 so as to cover a lateral side of the display unit 300. At this time, an upper surface of the guide sidewall 208 may be exposed to the external to cover the lateral side of the display unit 300, whereby the upper surface of the guide sidewall 208 may form a front edge of the display unit 300.

The set sidewall insertion groove 210 may be hollowly formed in a lower outer surface of the guide sidewall 208 except an upper outer surface of the guide sidewall 208. The set sidewall insertion groove 210 may be inserted into the set sidewall 102 so that the set sidewall insertion groove 210 is covered by the set sidewall 102.

In the display apparatus 10 according to the third embodiment of the present invention, the upper surface of the guide sidewall 208 may be exposed externally so as to cover the lateral side of the display unit 300, whereby the upper surface of the guide sidewall 208 may form a front edge of the display unit 300. This allows the same effects as those of the aforementioned display apparatus according to the first embodiment of the present invention.

Figure 9:
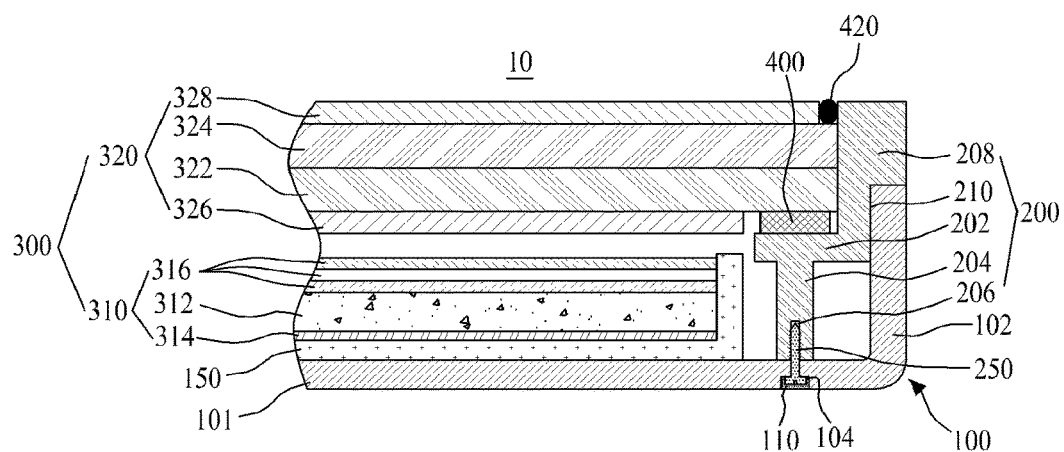
FIG. 9 illustrates a display apparatus according to a fourth exemplary embodiment of the present invention.

FIG. 9 illustrates a display apparatus according to a fourth exemplary embodiment of the present invention.

Referring to FIG. 9, the display apparatus 10 according to the fourth embodiment of the present invention may include a set cover 100, a guide frame 200, a screw 250, a display unit 300, an adhesive member 400, and a sealing member 420. Except that the sealing member 420 may be provided additionally, the display apparatus 10 according to the fourth embodiment of the present invention may be identical in structure to the display apparatus according to the third embodiment of the present invention shown in FIGS. 7 and 8, whereby a detailed explanation for the same parts will be omitted.

The sealing member 420 according to the first embodiment may be formed in a ring shape to be the same as the aforementioned second embodiment. The sealing member 420 may seal a gap between a lateral side of a liquid crystal display panel 320 and a guide sidewall 208 of the guide frame 200, thereby prevent foreign matters such as dust from coming into the inside of the display apparatus through the gap. In this case, a color of the sealing member 420 may be the same as a color of the guide frame 200, which allows good aesthetic exterior appearance of the display apparatus by preventing a color difference between the sealing member 420 and the guide sidewall 208.

Figure 10:
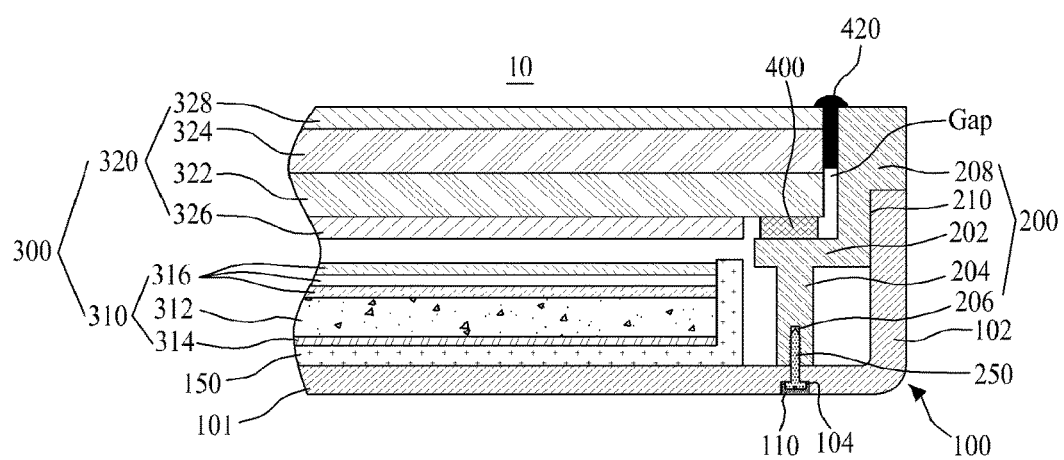
FIG. 10 illustrates a second exemplary embodiment of sealing member shown in FIG. 9.

As shown in FIG. 10, the sealing member 420 according to the second embodiment may be formed in a pin shape comprising a semicircular head, and a head supporter for supporting the semicircular head. In this case, the head supporter may be inserted into the gap, and the head is overlapped with the edge of the liquid crystal display panel 320 and the upper surface of the guide sidewall 208 so as to cover the gap. Accordingly, the gap may be sealed by the head of the sealing member 420, to thereby prevent foreign matters such as dust from coming into the inside of the display apparatus through the gap.

Figure 11:
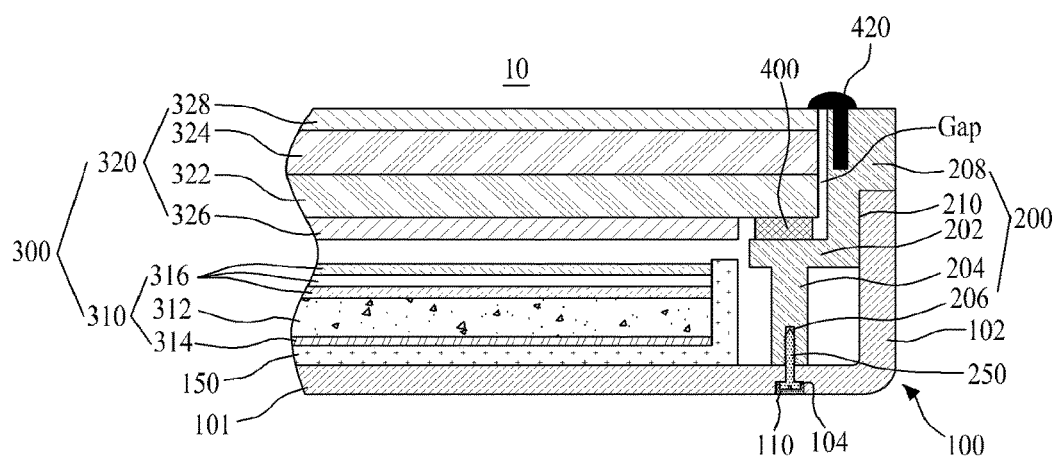
FIG. 11 illustrates a third exemplary embodiment of sealing member shown in FIG. 9.

As shown in FIG. 11, the sealing member 420 according to the third embodiment may comprise a semicircular head which covers the gap between the lateral side of the liquid crystal display panel 320 and the guide sidewall 208; and a head supporter which may be formed as one body with the upper inner portion of the guide sidewall 208 so as to support the head. In this case, the sealing member 420 may be formed simultaneously with the guide frame 200. That is, the sealing member 420 and the guide frame 200 may be formed by a double injection molding method. Accordingly, the gap may be sealed by the head of the sealing member 420, to thereby prevent foreign matters such as dust from coming into the inside of the display apparatus through the gap.

Figure 12:
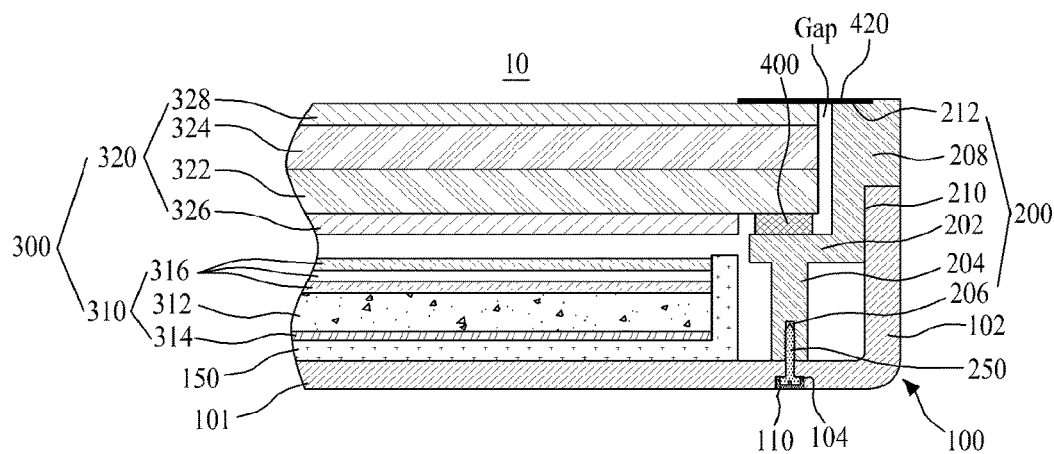
FIG. 12 illustrates a fourth exemplary embodiment of sealing member shown in FIG. 4.

As shown in FIG. 12, the sealing member 420 according to a fourth exemplary embodiment may be formed in a film type which is adhered to the upper edge of the liquid crystal display panel 320 and simultaneously to the partial portion of the upper surface of the guide sidewall 208, to thereby seal the gap therebetween. In this case, the film-type sealing member 420 may have 0.2t thickness, but not necessarily. The thickness of the sealing member 400 may be determined within a range to minimize step coverage with the liquid crystal display panel 320, which enables the good aesthetic exterior appearance of the display apparatus.

Meanwhile, if the film-type sealing member 420 is adhered to the entire upper surface of the guide sidewall 202, the sealing member 420 may be peeled off by a user's contact. In this respect, the sealing member 420 may be adhered to the partial portion of the upper surface of the guide sidewall 208. For this, a sealing member adhesion groove 212 may be formed in the upper surface of the guide sidewall 208, and the sealing member 420 is adhered to the sealing member adhesion groove 212. Accordingly, the film-type sealing member 420 may be adhered to the liquid crystal display panel 320, that is, between the upper edge of upper polarizing plate and the sealing member adhesion groove 212 of the guide sidewall 208, to thereby seal the gap between the lateral side of the liquid crystal display panel 320 and the guide sidewall 208. Thus, it may be possible to prevent foreign matters such as dust from coming into the inside of the display apparatus through the gap.

The display apparatus 10 according to the fourth embodiment of the present invention may seals the gap between the lateral side of the liquid crystal display panel 320 and the guide sidewall 208 through the use of ring-shaped, pin-shaped, or film-shaped sealing member 420, so that it is possible to prevent foreign matters such as dust from coming into the inside of the display apparatus through the gap. This allows the same effects as those of the aforementioned display apparatus according to the third embodiment of the present invention.

Figure 13:
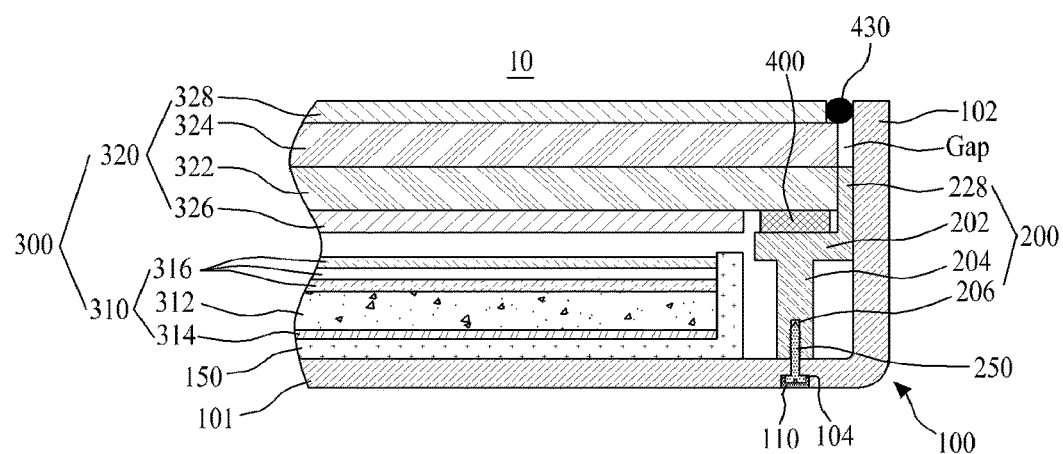
FIG. 13 illustrates a display apparatus according to a fifth exemplary embodiment of the present invention.

FIG. 13 illustrates a display apparatus according to a fifth exemplary embodiment of the present invention.

Referring to FIG. 13, the display apparatus 10 according to the fifth embodiment of the present invention may include a set cover 100, a guide frame 200, a screw 250, a display unit 300, and an adhesive member 400. Except the guide frame 200, the display apparatus 10 according to the fifth embodiment of the present invention may be identical in structure to the display apparatus according to the first embodiment of the present invention shown in FIGS. 2 to 4, whereby a detailed explanation for the same parts will be omitted.

Figure 14:
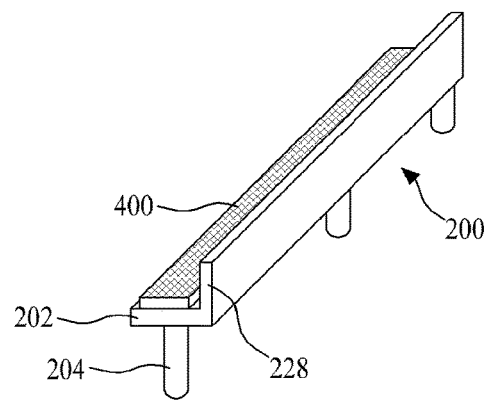
FIG. 14 is a perspective view illustrating a guide frame shown in FIG. 13.

The guide frame 200, which may be placed in a storage space of the set cover 100, may support the display unit 300, and simultaneously covers partial portions of a lateral side of the display unit 300. At this time, a color of the guide frame 200 may be the same as a color displayed for a non-driving mode of the display unit 300. For example, it is preferable that the guide frame 200 have a black color. For this, as shown in FIG. 14, the guide frame 200 may comprise a first part 202, a plurality of bosses 204, a screw coupling hole 206, and a guide sidewall 228. Except the guide sidewall 228, the guide frame 200 having the aforementioned structure may be identical in structure to the guide frame according to the first embodiment of the present invention, whereby a detailed explanation for the same parts will be omitted.

The guide sidewall 228 may be curved from the first part 202 so as to cover the partial portions of the lateral side of the display unit 300. At this time, an upper surface of the guide sidewall 228 may be installed between the lateral side of the display unit 300 and the set sidewall 102 so as to cover the lateral side of the display unit 300. The guide sidewall 228 may guide the liquid crystal display panel 320 in its placing onto the first part 202.

Meanwhile, the display apparatus 10 according to the fifth embodiment of the present invention may further comprise a sealing member 430 for sealing a gap between the set sidewall 102 and the lateral side of the display unit 300 above the upper portion of the guide sidewall 228.

As mentioned above, the sealing member 430 according to the first embodiment may be formed in a ring shape to seal the gap between the set sidewall 102 and the lateral side of the display unit 300, to prevent foreign matters such as dust from coming into the inside of the display apparatus through the gap.

Figure 15:
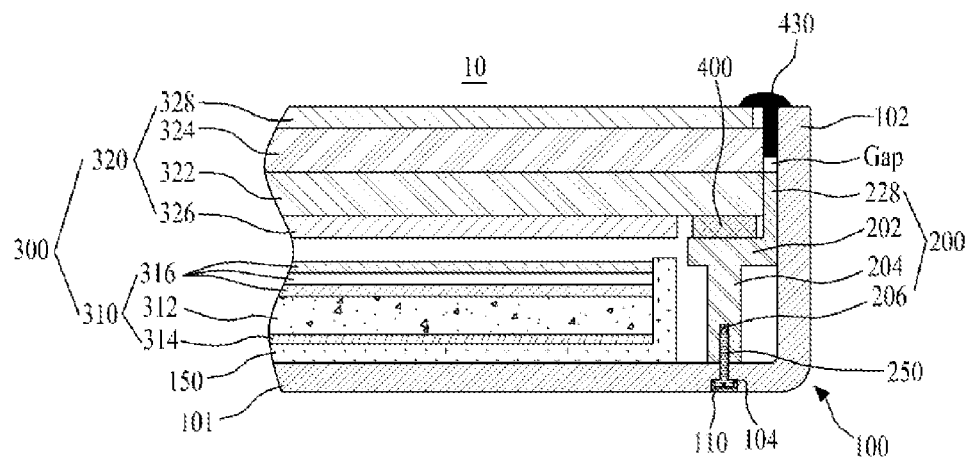
FIG. 15 illustrates a second exemplary embodiment of sealing member shown in FIG. 13.

As shown in FIG. 15, the sealing member 430 according to the second embodiment may be formed in a pin shape to seal the gap between the set sidewall 102 and the lateral side of the display unit 300, to thereby prevent foreign matters such as dust from coming into the inside of the display apparatus through the gap.

Except that the liquid crystal display panel 320 may be placed through the guide sidewall 228, the display apparatus 10 according to the fifth embodiment of the present invention may provide the same effects as those of the aforementioned first embodiment of the present invention.

Figure 16:
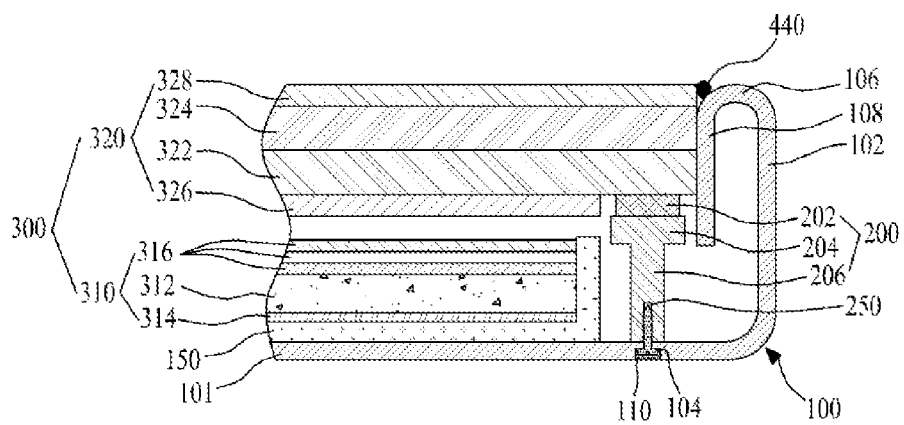
FIG. 16 illustrates a display apparatus according to a sixth exemplary embodiment of the present invention.

FIG. 16 illustrates a display apparatus according to a sixth exemplary embodiment of the present invention.

Referring to FIG. 16, the display apparatus 10 according to the sixth embodiment of the present invention may include a set cover 100, a guide frame 200, a screw 250, a display unit 300, and an adhesive member 400. Except the set cover 100, the display apparatus 10 according to the sixth embodiment of the present invention may be identical in structure to the display apparatus according to the first embodiment of the present invention shown in FIGS. 2 to 4, whereby a detailed explanation for the same parts will be omitted.

The set cover 100 may be formed in a rectangular-shaped frame for supporting the guide frame 200 and display unit 300, and covering a lateral side of the guide frame 200, whereby the set cover 100 functions as a cover of the manufactured display apparatus. The set cover 100 may comprise a set plate 101, a set sidewall 102, a bending part 106, and an inner sidewall 108. Except that the set cover 100 may additionally include the bending part 106 and inner sidewall 108, the set cover 100 according to the sixth embodiment of the present invention may be identical in structure to the display apparatus according to the first embodiment of the present invention, whereby a detailed explanation for the same parts will be omitted.

The bending part 106 may be bent from one end of the set sidewall 102 toward the display unit 300 while having a predetermined curvature. The bending part 106 may be exposed externally so as to cover the lateral side of the display unit 300, whereby the bending part 106 forms an edge of the display unit 300.

The inner sidewall 108 may be vertically extended from one end of the bending part 106 while being in parallel to the set sidewall 102.

Meanwhile, the display apparatus 10 according to the sixth embodiment of the present invention may further comprise a sealing member 440 to seal a gap between the lateral side of the liquid crystal display panel 320 and the bending part 160.

In the same manner as the sealing member 410 shown in FIG. 5, the sealing member 440 may be formed in a ring shape to seal the gap, to thereby prevent foreign matters such as dust from coming into the inside of the display apparatus through the gap. At this time, the sealing member 440 may be formed in a pin shape to be identical to the sealing member 410 shown in FIG. 6, according to a size (width) and depth of the gap.

In the display apparatus 10 according to the sixth embodiment of the present invention, the bending part 106 of the set cover 100 may form the edge of the display unit 300. This may provide the same effects as those of the aforementioned first embodiment of the present invention, and also realizes good aesthetic exterior appearance of the display unit.

Figure 17:
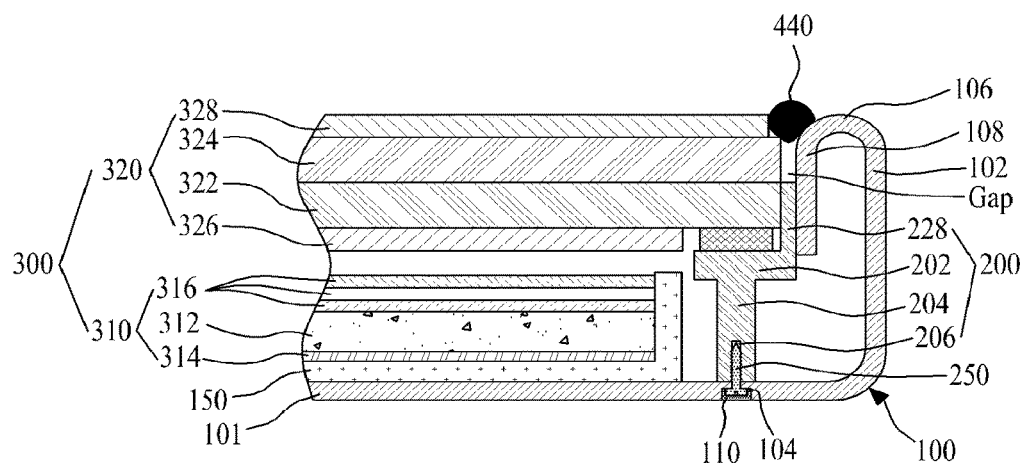
FIG. 17 illustrates a display apparatus according to another example of a sixth exemplary embodiment of the present invention.

Meanwhile, as shown in FIG. 17, the display apparatus 10 according to the sixth embodiment of the present invention may further comprise a guide sidewall 228 to be identical to the fifth embodiment of the present invention. In this case, the inner sidewall 108 of the set cover 100 may extend from the bending part 106 to cover the outer sides of the guide sidewall 228.

Due to the guide sidewall 228, the gap may occur between the lateral side of the liquid crystal display panel 320 and the bending part 106. In this case, the gap may be sealed by the aforementioned ring-shaped or pin-shaped sealing member 440.

Figure 18:
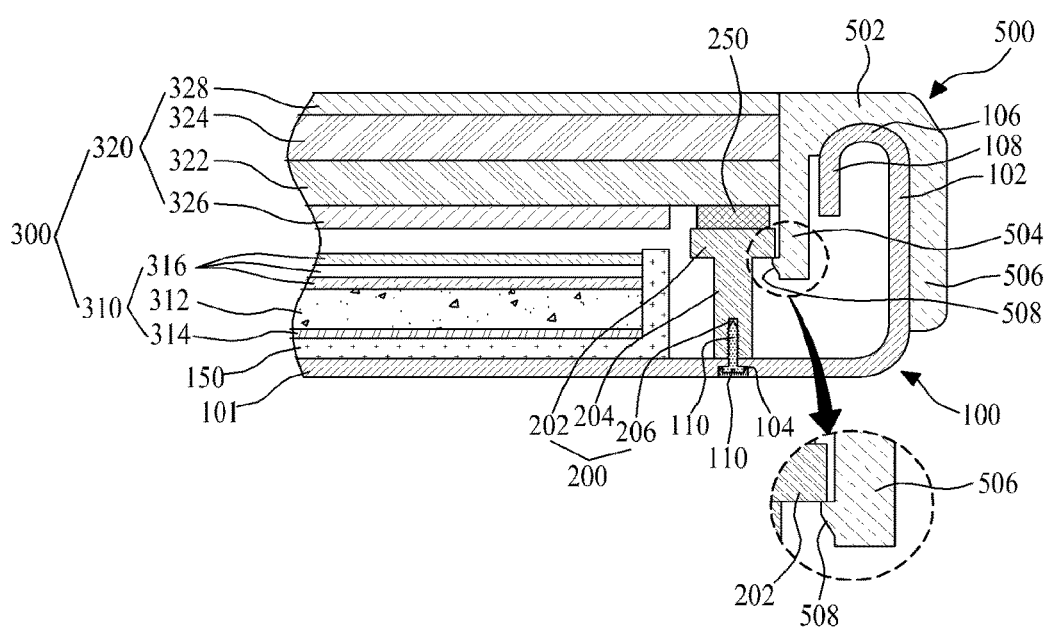
FIG. 18 illustrates a display apparatus according to a seventh exemplary embodiment of the present invention.

FIG. 18 illustrates a display apparatus according to a seventh exemplary embodiment of the present invention.

Referring to FIG. 18, the display apparatus 10 according to the seventh embodiment of the present invention may include a set cover 100, a guide frame 200, a screw 250, a display unit 300, an adhesive member 400, and an edge frame 500. Except the edge frame 500, the display apparatus 10 according to the seventh embodiment of the present invention may be identical in structure to the display apparatus according to the sixth embodiment of the present invention shown in FIG. 16, whereby a detailed explanation for the same parts will be omitted.

The edge frame 500 may be formed in shape "∩" to be connected to the guide frame 200 so that the ∩-shaped edge frame 500 forms an edge of the display unit 300. For this, the edge frame 500 may comprise a front part 502, an inner protrusion 504, an outer protrusion 506, and a coupling member 508.

The front part 502, which may be arranged to be in contact with the lateral side of the display unit 300, may cover a space between a lateral side of a liquid crystal display panel 320 and a bending part 106, and also covers the entire sides of the bending part 106, to thereby form the edge of the display unit 300.

The inner protrusion 504, which may vertically protrude from one end of the front part 502, may be inserted into the space between the lateral side of the liquid crystal display panel 320 and an inner sidewall 108 of the set cover 100, to thereby seal the space between the lateral side of the display unit 300 and the bending part 106.

The outer protrusion 506, which may vertically protrude from the other end of the front part 502, may cover the outer sides of the set sidewall 102.

The set sidewall 102, bending part 106, and inner sidewall 108 may be inserted into the ∩-shaped space prepared between the inner protrusion 504 and the outer protrusion 506.

The respective coupling members 508 may be provided at fixed intervals, wherein each coupling member 508 may protrude from the outer surface of the inner protrusion 504 toward the first part 202 of the guide frame 200. Each coupling member 508 may comprise a slant portion which is provided for a smooth connection to the guide frame 200; and a stepped portion which is coupled to a stepped surface of the first part 202 of the guide frame 200.

In the display apparatus 10 according to the seventh embodiment of the present invention, the edge frame 500 connected to the guide frame 200 may form the edge of the display unit 300. This may allow the same effects as those of the aforementioned display apparatus according to the first embodiment of the present invention.

For the above explanation, the display apparatus 10 may be used for a monitor or television, but not necessarily. The aforementioned display apparatus 10 according to the present invention may be used for a notebook computer or mobile device.

As mentioned above, the display apparatus according to the present invention may allow connection of the guide frame to the set cover through the use of screw, and to place the display unit onto the guide frame through the use of adhesive member, so that it is possible to decrease a total thickness (T) of the display apparatus by omitting lower and upper cases, and a front cover of product, which have been essentially used for the related art display apparatus.

If rework of the display apparatus is needed, the liquid crystal display unit may be easily separated from the set cover by the separation of the screw.

In addition, the edge width of the display unit may be decreased and the step coverage of the edge portion is minimized, to thereby manufacture the display apparatus having a novel design with the improved aesthetic exterior appearance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus comprising:
a set cover including a set plate, a screw insertion hole in the set plate, and a set sidewall curved from the set plate to form a storage space;
a guide frame in the storage space;
a plurality of screws coupled to the guide frame by penetrating through the set plate so as to fix the guide frame to the set cover;
a display unit including a display panel placed onto the guide frame; and
an adhesive member fixedly adhering a rear portion of the display panel to the guide frame,
wherein the guide frame comprises:
a first part coupled to a rear edge portion of the display panel by the adhesive member, the first part being divided into a plurality of sub first parts provided along each edge of the set plate;
a plurality of bosses protruding at fixed intervals from a rear surface of each of the plural sub first parts toward the set plate, the plurality of bosses being provided to meet with the screw insertion hole;
a plurality of screw coupling holes formed at each of the plurality of bosses, and each of the plurality of screws is coupled to each of the plurality of screw coupling holes by penetrating through the screw insertion hole of the set plate; and
a guide sidewall which is bent from each of the plurality of sub first parts so as to cover the lateral side of the display panel.

2. The display apparatus according to claim 1, wherein the lateral side of the display panel is directly covered by the guide sidewall of the guide frame.

3. The display apparatus according to claim 1, wherein the guide sidewall of the guide frame extends to cover a side edge of the display panel, and a front surface of the guide sidewall is flush with a front surface of the display panel, and
wherein no support member overlaps with or protrudes passed the front surface of the display panel and the guide sidewall.

4. The display apparatus according to claim 1, wherein a head of each of the plurality of screws is inserted into screw insertion holes, and
wherein an upper end of the guide sidewall is exposed externally so as to cover a lateral side of the display panel, and the upper end of the guide sidewall forms an edge of the display panel.

5. The display apparatus according to claim 1, wherein the guide frame further comprises a set sidewall insertion groove which is hollowly formed in a lower outer surface of the guide sidewall except an upper outer surface of the guide sidewall, wherein the set sidewall is inserted into the set sidewall insertion groove, and
wherein an upper surface of the guide sidewall is exposed externally so as to cover the lateral side of the display panel, and the upper surface of the guide sidewall forms an edge of the display panel.

6. The display apparatus according to claim 1, further comprising a sealing member in the front edge of the display panel so as to seal a gap between the lateral side of the display panel and the guide sidewall of the guide frame.

7. The display apparatus according to claim 6, wherein the sealing member is formed of any one of a ring type, a pin type having a head, and a film type.

8. The display apparatus according to claim 6, wherein the sealing member comprises:
a semicircular head covers the gap between the lateral side of the display panel and the guide sidewall; and
a head supporter installed as one body with the upper inner portion of the guide sidewall 208 so as to support the head.

9. A display apparatus comprising:
a set cover including a set plate, and a set sidewall curved from the set plate to form a storage space;
a guide frame in the storage space;
a screw coupled to the guide frame by penetrating through the set plate so as to fix the guide frame to the set cover;
a display unit including a display panel placed onto the guide frame; and
an adhesive member fixedly adhering a rear portion of the display panel to the guide frame;
wherein the set cover further comprises:
a bending part with a predetermined curvature, wherein the bending part is bent from one end of the set sidewall toward the lateral side of the display panel;
an inner sidewall vertically extending from an end of the bending part while being in parallel to the set sidewall, wherein the inner sidewall covers the lateral side of the display panel, and is set apart from the set sidewall in a direction parallel to the set plate, and wherein the set sidewall, the bending part and the inner sidewall form a continuous structure; and
a screw insertion hole in the set plate, wherein the screw penetrates through the screw insertion hole, and a head of the screw is inserted into the screw insertion hole.

10. The display apparatus according to claim 9, wherein the bending part, which is exposed to the external so as to cover the lateral side of the display panel, forms an edge of the display panel.

11. The display apparatus according to claim 9, wherein the first part is divided into a plurality of sub first parts provided along each edge of the set plate, and
wherein the plurality of bosses protrude from the rear surface of the first part divided into the plural sub first parts.

12. The display apparatus according to claim 9, wherein the guide frame further comprises a guide sidewall which is bent from the first part so as to cover the lateral side of the display panel, and
wherein the guide sidewall is installed between the lateral side of the display panel and the inner sidewall.

13. The display apparatus according to claim 9, further comprising an edge frame which is inserted into a space between the lateral side of the display panel and the inner sidewall, is installed to cover outer sides of the bending part and set sidewall, and is connected to the guide frame,
wherein the edge frame is exposed externally so as to cover the lateral side of the display unit, and the edge frame forms an edge of the display unit.

14. The display apparatus according to claim 13, wherein the edge frame comprises:
a front part arranged to be in contact with the lateral side of the display unit, the front part for forming an edge of the display unit;
an inner protrusion vertically protruding from one end of the front part, wherein the inner protrusion is inserted into a space between the lateral side of the display unit and the inner sidewall;
an outer protrusion vertically protruding from the other end of the front part, the outer protrusion for covering the outer side of the set sidewall; and
a coupling member in the lateral side of the inner protrusion, the coupling member coupled to the guide frame.

15. The display apparatus according to claim 9, further comprising a sealing member in the front edge of the display panel so as to seal a gap between the lateral side of the display panel and the bending part of the set cover.

16. The display apparatus according to claim 15, wherein the sealing member is formed of any one of a ring type.

17. A display apparatus comprising:
a set cover including a set plate, a screw insertion hole in the set plate, and a set sidewall curved from the set plate to form a storage space;
a guide frame in the storage space;
a plurality of screws coupled to the guide frame by penetrating through the set plate so as to fix the guide frame to the set cover;
a display unit including a display panel placed onto the guide frame;
an adhesive member fixedly adhering a rear portion of the display panel to the guide frame; and
a sealing member in the front edge of the display unit so as to seal a gap between the lateral side of the display unit and the set sidewall,
wherein the guide frame comprises:
a first part coupled to a rear edge portion of the display panel by the adhesive member, the first part being divided into a plurality of sub first parts provided along each edge of the set plate;
a plurality of bosses protruding at fixed intervals from a rear surface of each of the plural sub first parts toward the set plate, the plurality of bosses being provided to meet with the screw insertion hole; and
a plurality of screw coupling holes formed at each of the plurality of bosses, and each of the plurality of screws is coupled to each of the plurality of screw coupling holes by penetrating through the screw insertion hole of the set plate.

18. The display apparatus according to claim 17, wherein the sealing member is formed of any one of a ring type and a pin type having a head.

19. The display apparatus according to claim 17, wherein the guide frame further comprises a guide sidewall which is bent from each of the plurality of sub first parts so as to cover the lateral side of the display panel, and
wherein the guide sidewall is installed between the lateral side of the display panel and the set sidewall so as to overlap the sealing member.

* * * * *